July 19, 1966 L. H. S. ROBLEE, JR., ETAL 3,261,716
METHOD OF OPERATING A FUEL CELL CONTAINING
A SULFURIC-NITRIC ACID ELECTROLYTE
Filed Dec. 19, 1961
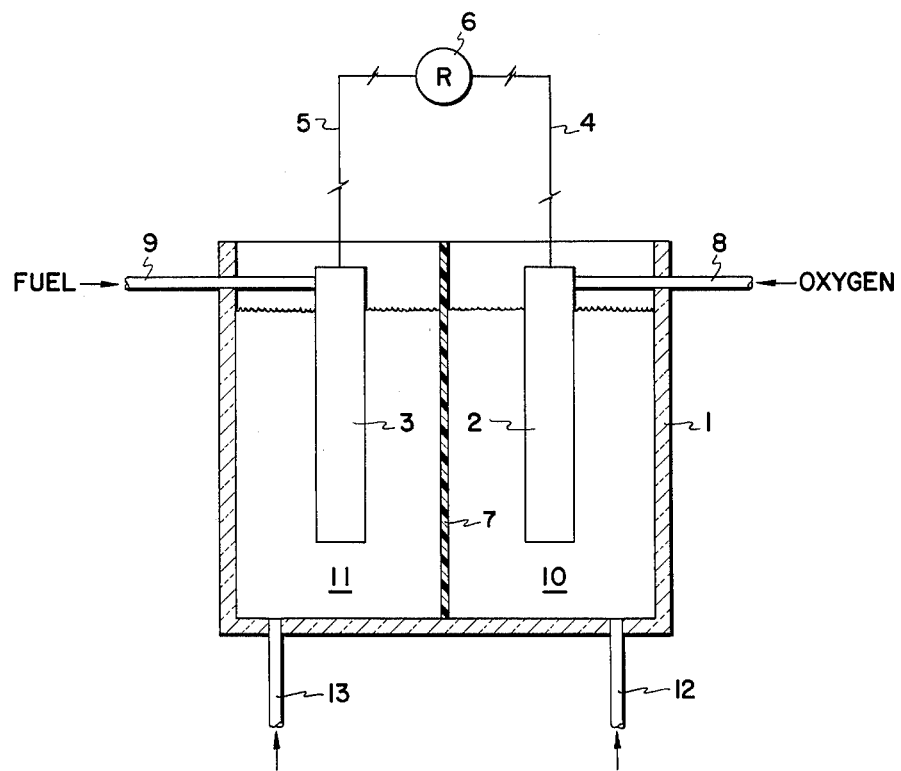
Leland H. S. Roblee, Jr.
Charles W. Foust    INVENTORS
BY *Alin B. Johnson*
PATENT ATTORNEY

United States Patent Office 3,261,716
Patented July 19, 1966

3,261,716
METHOD OF OPERATING A FUEL CELL CONTAINING A SULFURIC-NITRIC ACID ELECTROLYTE
Leland H. S. Roblee, Jr., Metuchen, and Charles W. Foust, Berkeley Heights, N.J., assignors to Esso Research and Engineering Company, a corporation of Delaware
Filed Dec. 19, 1961, Ser. No. 160,568
3 Claims. (Cl. 136—86)

This invention relates to improvements in fuel cells for the conversion of chemical energy to electrical energy by electrochemical oxidation of a fluid, combustible fuel. In particular, this invention relates to improved methods of operating a fuel cell employing an acid electrolyte and to a novel electrolyte for use therein. More particularly, this invention relates to the use of nitric acid in combination with sulfuric acid in feul cell electrolytes.

Fuel cells employing acid electrolytes are known in the art. The term "fuel cell' is used herein to refer to a device, apparatus or system wherein hydrogen or a fluid organic compound of lower oxidation state than carbon dioxide is oxidized electrochemically with resulting net production of electrical energy. The fuels suitable for use in these cells are well known in the art and need not be dealt with exhaustively here. In general, the preferred fuels are the hydrogen-comprising fuels, i.e., hydrogen and organic compounds containing hydrogen in their molecular structure, e.g., $C_1$–$C_{12}$ hydrocarbons and oxygen substituted hydrocarbons having a significant solubility in the electrolyte employed.

Especialy preferred fuels include $C_1$ to $C_5$ alcohols, $C_2$ to $C_5$ olefins, $C_2$ to $C_3$ glycols, and hydrogen. Higher molecular weight organic compounds may also be used employing techniques known in the art. These include hydrocarbons and substituted hydrocarbons of carbon, hydrogen and oxygen which may include other substituents. In the case of higher molecular weight fuels, one may employ elevated temperatures, mutual solvents and other techniques known in the art to increase fluidity, solubility and reactivity.

The use of nitric acid as the catholyte of a fuel cell employing a divided electrolyte is known in the art. In cells of this type heretofore disclosed, an anolyte of sulfuric acid is separated from the catholyte by an ion-permeable membrane and a relatively high concentration of nitric acid is required in the catholyte. Thus, in British Patent 844,584 it is stated that the strength of the nitric acid (in the catholyte) can vary from 2 to 10 normal, i.e. about 12 to 48.5 weight percent.

The overall fuel cell reaction is the sum of two essentially independent half-cell reactions. At the anode hydrogen or a hydrogen-containing liquid or gas is electrochemically oxidized with a release of electrons to the anode while an oxidant is reduced at the cathode with an acceptance of electrons. The electrical circuit is completed by ion transfer between electrodes through the electrolyte and electron transfer between electrodes by conductors positioned outside such electrolyte. Such cells may be electrically connected in series and/or parallel. The effective operation of a fuel cell is therefore dependent upon the effective operation of both cathodic and anodic half-cells.

At the present level of technological development, a fuel cell cannot be effectively operated with high concentrations of nitric acid or the $-NO_3$ ion in contact with the anode or fuel electrode.

Although the cathodic half-cell reaction functions well with nitric acid in contact with the cathode, the same acid adversely affects the anodic half-cell reaction. When nitric acid is employed in the anolyte in concentrations heretofore suggested for use in the catholyte, the electrical energy generated in the cell is reduced to insignificance or completely extinguished.

It now has been discovered that the advantages of having nitric acid in the catholyte and sulfuric acid in the anolyte can be obtained without the problem inherent in attempting to avoid intermingling between two different and separated aqueous solutions of high acid concentration.

In accordance with this invention, a fuel cell is operated with an aqueous electrolyte in contact with both cathode and anode which contains about 0.1 to 1.0, preferably 0.4 to 0.9 weight percent, $HNO_3$ in combination with sulfuric acid. The nitric acid may be employed with $H_2SO_4$ concentrations heretofore employed in single acid electrolytes. These usually contain about 3 to 50 weight percent sulfuric acid with low concentrations in the range of about 3 to 10 weight percent preferred in certain embodiments employing certain fuels and operating conditions, while those of higher concentrations, usually in the range of about 20 to 40 weight percent, are preferred in other embodiments employing different fuels or different conditions. The addition of $HNO_3$ is particularly effective with $H_2SO_4$ concentrations in the range of about 25 to 35 weight percent.

Acid resistant electrode materials suitable for use in sulfuric acid may be used with the mixed electrolytes of this invention.

It is within the scope of this invention to carry out the cell operation employing a conventional gas diffusion cathode of suitable acid resistant material to introduce the oxygen gas to the electrolyte. However, the electrolyte of this invention makes feasible a method of novel operation wherein the continuous supply of oxygen gas, either as pure oxygen or admixed as in air, is introduced directly into the electrolyte before or without contacting the cathode. This eliminates the many problems and limitations inherent in the use of "gas diffusion electrodes."

In the past it has been possible to successfully employ a fuel electrode or anode which was no more complicated in construction than a simple sheet of metal surfaced with the desired catalyst. Anodes of this type have been used with anolyte soluble fuels, e.g. methyl alcohol. However, the effectiveness of the cathode has been limited in cells receiving a continuous flow of oxygen gas by the necessity for three-phase contact between such gaseous oxidant, the liquid electrolyte and the solid conductor or cathode. The terms "gas diffusion electrode" and "non-diffusion electrode" have acquired a meaning in the art and are employed in accordance with such meaning. Basically the meaning of the terms is concerned with the manner in which they are employed, although certain types of electrode structures have become identified with one or the other of such terms. An electrode functions as a diffusion electrode when a reactant gas, i.e., fuel or oxidant as the case may be, passes into, through, or along a surface of the electrode before contacting the liquid electrolyte. An electrode function as a non-diffusion electrode when the half-cell reaction involved is carried out with the reactant passing directly into the electrolyte without first contacting the electrode.

The most common type of electrode structure utilized as a diffusion electrode is the porous electrode of carbon or suitable metal. These may take the form of a unit comprising two or more plates of different porosity, or a single structure of the so-called "dual porosity" type wherein relatively large pores containing gas and relatively small pores containing liquid electrolyte meet or intersect within a conductive material.

In the electrolyte mixture herein employed, there is no necessity for the oxygen gas admitted to the electrolyte to contact the cathode since the oxygen is primarily employed to regenerate reduction products of the nitric acid in the electrolyte.

It is within the scope of this invention to use this electrolyte in a cell having a single electrolyte compartment, or, in a cell having the electrolyte compartment divided by an ion-permeable partition into an anolyte and a catholyte. Various membranes or other porous dividers are often employed even with a single acid electrolyte where it is desired to restrict the fuel and partial oxidation products thereof to the anolyte or oxidant bubbles to the catholyte.

Partitions suitable for this use are well known in the art and do not, as such, constitute a part of this invention. Various materials have been used for this purpose including glass frits, ceramics, membranes, etc. Membranes that have been used for this purpose include ion-exchange resin membranes and interpolymer membranes.

Ion-exchange resin membranes, i.e., organic membranes, at least one component of which is a polyelectrolyte, are well known in the art. Such membranes include in their polymeric structure dissociable ionizable radicals at least one ionic component of which is fixed to or retained by a polymeric matrix with at least one ion component being a mobile and replaceable ion electrostatically associated with the first component. The ability of the mobile ion to be replaced under appropriate conditions by other ions imparts ion-exchange characteristics to these materials.

An interpolymer membrane is one which is cast from a solution containing both a polymeric electrolyte or ionogenic material and a matrix polymer so as to form a film composed of these two intermeshed molecular species. A typical interpolymer membrane is made by dissolving linear polystyrene sulfonic acid and acrylonitrile in N,N-dimethylformamide, casting the solution as a film and evaporating off the solvent.

The electrolyte of this invention is prepared by mixing the proper amounts of each acid, or, in the alternative, by mixing sulfuric acid with a suitable salt which releases the $-NO_3$ ion in aqueous solution so as to provide the necessary $-NO_3$ concentration.

Cells employing the mixed electrolyte of this invention preferably are operated at temperatures above about 130° F. and below the boiling point of the electrolyte at the pressure employed, e.g., 130° to about 200° F. when operating at atmospheric pressure.

Referring now to the accompanying drawing which schematically illustrates a simple fuel cell which may be used for carrying out this invention, shown in the drawing are a vessel 1, cathode 2 and an anode 3. Cathode 2 and anode 3 are electrically connected by wires 4 and 5 and resistance means 6, which may be any device for utilizing electric current or merely an extension of wires 4 and 5. Vessel 1, made of glass, ceramic, polypropylene, hard rubber, metal, or other suitable material, forms an electrolyte compartment and is here shown uncovered although in practical employment, such cells would ordinarily be covered. Cathode 2 and anode 3 may be a hollow, porous cylinder, metal sheets or grids, a nonconductor surfaced with a continuous surface of a suitable metal, or, in other embodiments, a porous carbon plate where the electrode is built into the wall forming the electrolyte compartment. The carbon electrodes may be impregnated with a suitable metal catalyst. The anode catalyst is preferably a noble metal of the Group VIII of the Periodic Table that is chemically resistant to the electrolyte or mixtures of the same with each other or with gold. The cathode catalyst may be the same or different and here gold is most preferred. If metal plates or grids are employed, it is preferred to completely surface the electrode with one or more of these same metals. Other metals heretofore successfully employed in fuel cells utilizing a mineral acid electrolyte may also be used. The electrolyte compartment formed by vessel 1 is here divided by an ion-permeable membrane 7, e.g., an ion-exchange resin membrane, into a catholyte compartment 10 and an anolyte compartment 11. Membrane 7 is optional equipment.

When cathode 2 and anode 3 are porous carbon cylinders, a fluid oxidant, e.g., oxygen gas, is admitted to the interior of cathode 2 via conduit 8 and a fluid fuel, e.g., hydrogen, is admitted to the interior of anode 3 via conduit 9. When cathode 2 and anode 3 are metal sheets or metal grids, a fluid oxidant, e.g., air, is admitted to the catholyte compartment 10 via conduit 12 and a soluble or absorbable fluid fuel, e.g., methyl alcohol or butene-1, is admitted to anolyte compartment 11 via conduit 13.

This invention will be more fully understood from the following examples which are for purposes of illustration only, and should not be construed as limitations upon the scope of this invention as set forth in the appended claims.

*Example 1*

A fuel cell employing hydrogen gas as the combustible fuel, and oxygen gas as the oxidant, was operated with an aqueous sulfuric acid electrolyte and the operation was then repeated with the same cell using an aqueous sulfuric acid electrolyte containing 1 weight percent $HNO_3$. The anode and cathode were porous carbon impregnated with about 2 weight percent of a mixed metal catalyst containing 95 weight percent platinum and 5 weight percent gold. The fuel and oxidant were admitted into contact with the electrolyte through the porous anode and porous cathode respectively. The electrolyte temperature was 180° F. The results obtained are set forth in the following table:

TABLE I.—COMPARATIVE PERFORMANCE OF SULFURIC ACID AND MIXED $H_2SO_4$—$HNO_3$ ELECTROYLTES OF LOW $HNO_3$ CONTENT

| Electrolyte, Acid Composition | Measured Cell Voltage, volts | Current Density, amps./ft.* |
|---|---|---|
| $H_2SO_4$, 30 wt. percent | 0.94 | 0 |
|  | 0.78 | 10 |
|  | 0.30 | 30 |
| Mixed: | 1.00 | 0 |
| $H_2SO_4$, 29 wt. percent | .90 | 10 |
| $HNO_3$, 1 wt. percent | .66 | 30 |

*Superficial area of cathode in contact with electrolyte.

*Example 2*

The operation of a cell using 1% $HNO_3$ and 29 weight percent $H_2SO_4$ as the electrolyte, was tested with both pure oxygen and air employed as the oxidant. The rate of improvement evidenced in Example 1 was found to be essentially the same for both oxidants.

*Example 3*

The effect of $HNO_3$ concentration upon the performance of each half cell was tested by varying the $HNO_3$ content of an aqueous sulfuric acid electrolyte wherein the total acid concentration, i.e., $HNO_3+H_2SO_4$, was 30 weight percent in each run. The electrodes were platinum and gold impregnated porous carbon which had been "wetproofed" by the deposition of polytetrafluoroethylene upon the surfaces of the larger pores. The electrolyte temperature was 180° F. The oxidant was oxygen gas at one atmosphere. The results obtained in comparing various $HNO_3$ concentrations are set forth in the following table:

TABLE II.—EFFECT OF $HNO_3$ CONCENTRATION IN $H_2SO_4$—$HNO_3$ ELECTROLYTE, $H_2$-ANODE AND $O_2$-CATHODE PERFORMANCE

| Percent $HNO_3$ in 29-30% $H_2SO_4$ | Volts Polarization* (Loss) from Respective Theory* at 10 and 30 amps./ft.² | | | | | |
|---|---|---|---|---|---|---|
| | 10 | | | 30 | | |
| | $H_2$ | $O_2$ | Combined Loss | $H_2$ | $O_2$ | Combined Loss |
| 0.0 | 0.19 | 0.38 | 0.57 | 0.32 | 0.53 | 0.85 |
| 0.1 | 0.19 | 0.28 | 0.47 | 0.32 | 0.51 | 0.83 |
| 0.2 | 0.18 | 0.20 | 0.38 | | | |
| 0.4 | 0.18 | 0.15 | 0.33 | 0.30 | 0.35 | 0.65 |
| 0.5 | 0.18 | 0.14 | 0.32 | 0.30 | 0.31 | 0.61 |
| 0.65 | 0.18 | 0.13 | 0.31 | 0.34 | 0.19 | 0.53 |
| 0.80 | 0.18 | 0.13 | 0.31 | 0.33 | 0.20 | 0.53 |
| 0.90 | 0.18 | 0.13 | 0.31 | 0.34 | 0.19— | 0.53 |
| 1.0 | 0.18 | 0.11 | 0.29 | 0.56 | 0.18 | 0.74 |
| 2.0 | 0.34 | 0.11 | 0.45 | >1.20 | | |

*The term "polarization" wherever employed in this specification, refers to the difference between observed voltage and the voltage of a reversible electrode operating with the same reactant, temperature, pressure, and electrolyte. It does not refer to the difference between observed voltage and open circuit voltage (rest potential). Theoretical potential (at 180° F., 1 atmosphere, and 30 wt. % $H_2SO_4$) for the oxygen electrode is 1.21 volts and for the hydrogen electrode 0.01 volts below (negative to) Standard Hydrogen Reference.

Note the advantages to be gained at the cathode by increasing the $HNO_3$ concentration above 1 weight percent are comparatively small, while the losses at the anode are great. Thus, by limiting the $HNO_3$ content as hereinbefore set forth, overall improvement of the cell operation can be achieved over a single acid electrolyte.

*Example 4*

Methanol was substituted for hydrogen as the fuel and the procedure of the previous example followed. Anodic polarization with 0.1 weight percent $HNO_3$ compared favorably with the equivalent hydrogen run.

*Example 5*

Cells were operated with a mixed $HNO_3$—$H_2SO_4$ electrolyte in accordance with the invention as hereinbefore set forth, and substantially in accordance with the foregoing examples except that a variety of acid resistant electrodes were successfully employed, as both anodes and cathodes, including unmetallized porous carbon, platinum impregnated carbon, gold surfaced non-porous metal strips, and platinum surfaced non-porous metal strips. The advantages of the electrolyte of this invention were demonstrated in each instance varying somewhat in degree in accordance with the effectiveness of the catalytic effect of the various electrode materials. Runs were also made employing an ion-permeable membrane dividing the electrolyte compartment into an anolyte compartment and a catholyte compartment. Air and oxygen gas are alternatively admitted directly to the catholyte when non-porous electrodes are used.

It is to be understood that the terms "anode" and "fuel electrode" are used interchangeably herein as are the terms "cathode" and "oxygen electrode."

The terms "mixtures" and "acid mixture" are used herein to refer to any intermingling of two or more acids including mixed solutions.

What is claimed is:
1. A method of operating a fuel cell comprising in combination an anode, a cathode spaced apart from said anode, an electrolyte compartment adapted to retain liquid extending between and communicating with said anode and said cathode, an aqueous sulfuric acid electrolyte consisting essentially of about 3 to 50 wt. percent sulfuric acid and about 0.1 to 1.0 wt. percent nitric acid in said electrolyte compartment providing means for ionic conductance between said anode and said cathode, which comprises passing a fluid fuel into dual contact with said anode and said electrolyte; passing a fluid oxidant into said electrolyte compartment; and establishing electrical connection between said anode and said cathode external to said electrolyte.

2. A method in accordance with claim 1 wherein said electrolyte contains about 0.4 to 0.9 wt. percent nitric acid.

3. A method in accordance with claim 1 wherein said electrolyte contains about 25 to 35 wt. percent sulfuric acid.

References Cited by the Examiner

UNITED STATES PATENTS

| 844,664 | 4/1908 | Jungner | 136—136.6 |
| 2,901,522 | 8/1959 | Bopp | 136—86 X |

FOREIGN PATENTS 844,584   8/1960   Great Britain.

WINSTON A. DOUGLAS, *Primary Examiner.*

JOHN R. SPECK, *Examiner.*

H. FEELEY, A. B. CURTIS, *Assistant Examiners.*